2,318,839
Patented May 9, 1967

3,318,839
BUILDING MATERIAL COMPOSITIONS FOR THE MANUFACTURE OF WATER-REPELLENT PRODUCTS
Helmut Weissbach, Opladen, Germany, assignor to Farbenfabriken Bayer Aktiengesellschaft, Leverkusen, Germany, a German corporation
No Drawing. Filed Feb. 12, 1963, Ser. No. 257,845
Claims priority, application Germany, Feb. 19, 1962, F 36,068; May 15, 1962, F 36,807
2 Claims. (Cl. 260—37)

The invention relates to an improvement of building material compositions of lime or cement as binders and customary aggregates, which contain hydrophobing siloxane additives.

The manufacture of water-repellent products of lime or cement mortar (concrete, asbestos cement) containing alkyl polysiloxane in powdered or liquid form is known. This siloxane content leads to a very effective hydrophobic property, in most cases already in quantities of less than 1 percent by weight of dry building material composition, but it has been found in the meantime that under unfavourable hardening conditions, for example in cold wet weather, there are formed on the surface of the finished products whitish films of calcium carbonate which may substantially impair their appearance. The removal of such so-called efflorescences, for example from a facade plaster, is hardly possible without damaging it and involves in any case substantial expenditure.

It has now been found that the occurrence of these efflorescences can be obviated by adding to the building material composition of known type, besides the hydrophobing alkyl polysiloxanes, a small amount of commercial, finely powdered magnesium carbonate. The necessary amount varies according to the composition of the building material mixture, especially its content of alkyl polysiloxane. Normally 5 percent by weight at most are required, in most cases an amount between 1 and 3 percent by weight, referred to the dry composition, is sufficient. The addition of these quantities not only prevents the efflorescence, but also improves the water-repellent effect, without noticeably changing the strength and other properties.

Furthermore, it has been found that, instead of magnesium carbonate, a carbonate or silicate of an alkali metal can also be employed. This has the further advantage that such alkali metal compounds are less expensive than magnesium carbonate and that a smaller amount thereof is necessary, namely between 0.1 and 1 percent by weight. Normally, a portion of about 0.5 percent by weight of dry composition will be sufficient.

The invention therefore comprises building material compositions containing lime or cement as a binder, alkyl polysiloxane as hydrophobing component, and a portion, amounting to between 0.1 and 5 percent by weight of dry building material composition, of an alkali metal carbonate, alkali metal hydrogen carbonate, alkali metal silicate or finely powdered magnesium carbonate.

The following examples are given for the purpose of illustrating the invention.

*Example 1*

With each 1000 g. of a commercial dry mortar of facing plaster there are mixed 20 g. of red iron oxide for colouring, 5 g. of a methyl polysiloxane powder, such as is described in more detail, for example, in copending application Serial No. 771,160, filed October 31, 1958, issued to Patent No. 3,098,050, which has been assigned to the same assignee, and, according to the invention, 5 g. of anhydrous sodium carbonate.

From such a mixture a soft mortar was prepared with water and applied 1 cm. thick to plates of hardened lime-cement mortar. For comparison, a mixture without the addition of sodium carbonate according to the invention, but otherwise of the same composition, was subjected to the same procedure. The plates were then placed in the open in cool weather (temperature between 5 and 10° C.). After about 24 hours, when the surface was slightly hardened, it was roughened with a steel brush.

Of the hardened plates the control pieces produced without the use of sodium carbonate showed whitish efflorescences after 3 days. In contrast, the pieces produced according to the invention retained their uniform bright red appearance.

*Example 2*

The sodium carbonate used in Example 1 is replaced by the same amount by weight of a commercial sodium silicate powder of the composition $Na_2O \cdot 1.85\ SiO_2+$ aqua containing 53 percent by weight of $SiO_2$, the procedure being otherwise completely analogous.

The test result was the same as that described in Example 1.

*Example 3*

In order to produce a plastering mortar, 10 parts by weight of sand having a particle size of at most 3 mm. and 1 part by weight each of white lime and Portland cement (PZ 275) are mixed. To each 100 parts by weight of this mixture there are added (A) For the purpose of comparison, no further additive;
(B) For further comparison, 0.5 part by weight of a methyl polysiloxane powder as described in more detail in the aforesaid copending application, for example;
(C) According to the invention, 0.5 part by weight of methyl polysiloxane powder as under (B) and 2 parts by weight of commercial "magnesium carbonate, fine, light" (42.5 percent by weight of MgO, 40 percent by weight of $CO_2$).

From these three mixtures 6 test pieces each were produced in such a manner that plastic mortars were prepared by the addition each time of 20 parts by weight of water, and shaped into cylindrical discs of 60 mm. diameter and 12 mm. height. Of the 18 discs thus prepared, three identical pieces each of the mortars specified under (A), (B) and (C) were stored in two test series, namely (a) At 5 to 10° C. and a relative atmospheric humidity oscillating between 30 and 90%,
(b) At 25° C. and 70% relative atmospheric humidity.

During this storage, the surface of the discs, after hardening, was slightly scraped off with a steel brush and then, and also on the following two days, sprayed twice daily with distilled water. The results of the above-mentioned series (a) and (b) were as follows:

(a) Of the nine test pieces stored at between 5 and 10° C. and in changing atmospheric humidity, the three obtained according to (B) showed incipient efflorescences after 4 days, whereas the test pieces obtained according to (A) and (C) remained permanently free of efflorescences.

(b) All of the nine test pieces stored at 25° C. remained free of efflorescences for 12 days. They were then dried at 60° C., then weighed, and immersed 2 mm. deep in water placed on a grid. The water absorbed after ½, 2, 7 and 24 hours respectively was determined by weighing. The following table shows the mean values of three identical test pieces each; the percentages (%) denote percent by weight of absorbed water, referred to the dry weight of the test piece.

|  | After— | | | |
| --- | --- | --- | --- | --- |
|  | ½ hour | 2 hours | 7 hours | 24 hours |
| (A) percent | 10.4 | 10.5 | 10.9 | 11.4 |
| (B) percent | 0.3 | 0.6 | 1.0 | 8.0 |
| (C) percent | 0.3 | 0.6 | 0.9 | 2.9 |

These test results show the favourable effect of the magnesium carbonate additive with regard to the tendency of the water-repellent building materials to bloom, and also with regard to their hydrophobic property under the prolonged action of water.

Similar advantageous results were obtained with plaster of different composition, especially with the commercial, so-called facing plaster.

What is claimed is:

1. A building material composition comprising a binding material selected from the group consisting of plaster mortars, concrete, lime and asbestos cement, a pulverulent methyl polysiloxane insoluble in water having a grain size of below $1\mu$, the weight of said methyl polysiloxane being about 0.5% of the entire composition suitable for imparting water-repellency to masonry, and from 1 to 5 percent by weight of the resulting dry composition of finely powdered magnesium carbonate.

2. A building material composition according to claim 1, wherein said magnesium carbonate is present in an amount of from 1% to 3%.

References Cited by the Examiner
UNITED STATES PATENTS

| | | | |
|---|---|---|---|
| 2,868,295 | 1/1959 | Brooks et al. | 106—89 |
| 3,047,407 | 7/1962 | Ehrenburg | 106—119 |
| 3,086,953 | 4/1963 | Nitzsche et al. | 106—119 |
| 3,098,050 | 7/1963 | Noll et al. | 260—37 |
| 3,118,779 | 1/1964 | Leonard | 106—89 |

MORRIS LIEBMAN, *Primary Examiner.*

A. H. KOECKERT, J. FROME, *Assistant Examiners.*